(12) United States Patent
Franco et al.

(10) Patent No.: US 8,842,648 B2
(45) Date of Patent: Sep. 23, 2014

(54) APPARATUS, METHOD AND PROGRAM PRODUCT FOR SEAMLESS WIFI NETWORK TRANSITIONS

(75) Inventors: Lucas Goncalves Franco, Sao Paula (BR); Peeyush Jaiswal, Boca Raton, FL (US); Breno Henrique Leitao, Guanabara Campinas (BR); Christopher A. Robbins, Monroe Township, NJ (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 13/209,238

(22) Filed: Aug. 12, 2011

(65) Prior Publication Data

US 2013/0039353 A1    Feb. 14, 2013

(51) Int. Cl.
*H04W 4/00*    (2009.01)

(52) U.S. Cl.
USPC ............ 370/338; 370/331; 455/445; 455/500

(58) Field of Classification Search
USPC ........................ 370/338, 331; 455/500, 445
See application file for complete search history.

(56) References Cited

U.S. PATENT DOCUMENTS

| | | | |
|---|---|---|---|
| 6,243,581 B1 | 6/2001 | Jawanda | |
| 7,729,366 B2 * | 6/2010 | Mok et al. | 370/401 |
| 7,734,293 B2 | 6/2010 | Zilliacus et al. | |
| 2002/0131386 A1 | 9/2002 | Gwon | |
| 2007/0189218 A1 | 8/2007 | Oba et al. | |
| 2008/0117884 A1 | 5/2008 | Ishii et al. | |
| 2009/0047948 A1 | 2/2009 | Turetsky et al. | |
| 2010/0008291 A1 * | 1/2010 | LeBlanc et al. | 370/328 |
| 2010/0238793 A1 | 9/2010 | Alfano et al. | |
| 2011/0058532 A1 * | 3/2011 | Berzin | 370/331 |
| 2012/0230293 A1 * | 9/2012 | Grinshpun et al. | 370/331 |
| 2013/0031271 A1 * | 1/2013 | Bosch et al. | 709/245 |

FOREIGN PATENT DOCUMENTS

| | | |
|---|---|---|
| EP | 1527633 B1 | 5/2009 |
| EP | 2173126 A2 | 4/2010 |

OTHER PUBLICATIONS

Zhao, Yanchao et al., On Handoff Optimization in Wireless Networks: From a Navigation Perspective, Wireless Communications and Networking Conference (WCNC), 2010 IEEE, Apr. 18-21, 2010, pp. 1-6.
Pralhad Deshpande et al., Predictive Methods for Improved Vehicular WiFi Access, MobiSys'09, Jun. 22-25, 2009, pp. 263-276, Krakow, Poland.

(Continued)

*Primary Examiner* — Albert T Chou
(74) *Attorney, Agent, or Firm* — George R. McGuire; John Pivnichny; Bond Schoeneck & King, PLLC

(57) ABSTRACT

An apparatus, a method and a computer program product for seamless transition between WiFi networks (including in particular WiFi Internet networks) includes within a mobile communication apparatus a mobility layer that is tunneled to a mobility server within a network infrastructure. The mobile communications apparatus includes a wireless network capability, a global positioning system capability, an internal network protocol address and a routing capability. The apparatus, the method and the computer program product also provide that the mobility layer is programmed to sequentially and automatically tunnel to the mobility server at an available geographically defined WiFi network access location predicated upon a global positioning system determined position of the mobile communication apparatus. Embodiments also provide seamless transitions between WiFi networks and cellular networks.

14 Claims, 5 Drawing Sheets

(56) References Cited

OTHER PUBLICATIONS

H. Wang, et al., "A Network-Based Local Mobility Management Scheme for Wireless Mesh Networks", Proc. IEEE Wireless Communications and Networking Conference 2007 (WCNC 2007), Mar. 2007, pp. 3795-3800.

RFC 2002, "IP Mobility Support", IBM, Oct. 1996, pp. 1-72.

J. Montavont, et al., "IEEE 802.11 Handovers Assisted by GPSInformation," IEEE International Conference on Wireless and Mobile Computing, Networking and Communications 2006 (WiMob 2006), Jun. 2006, pp. 166-172.

International Search Report Form PCT/ISA/210, International Application No. PCT/CA2012/050506, pp. 1-3, Dec. 12, 2012.

* cited by examiner

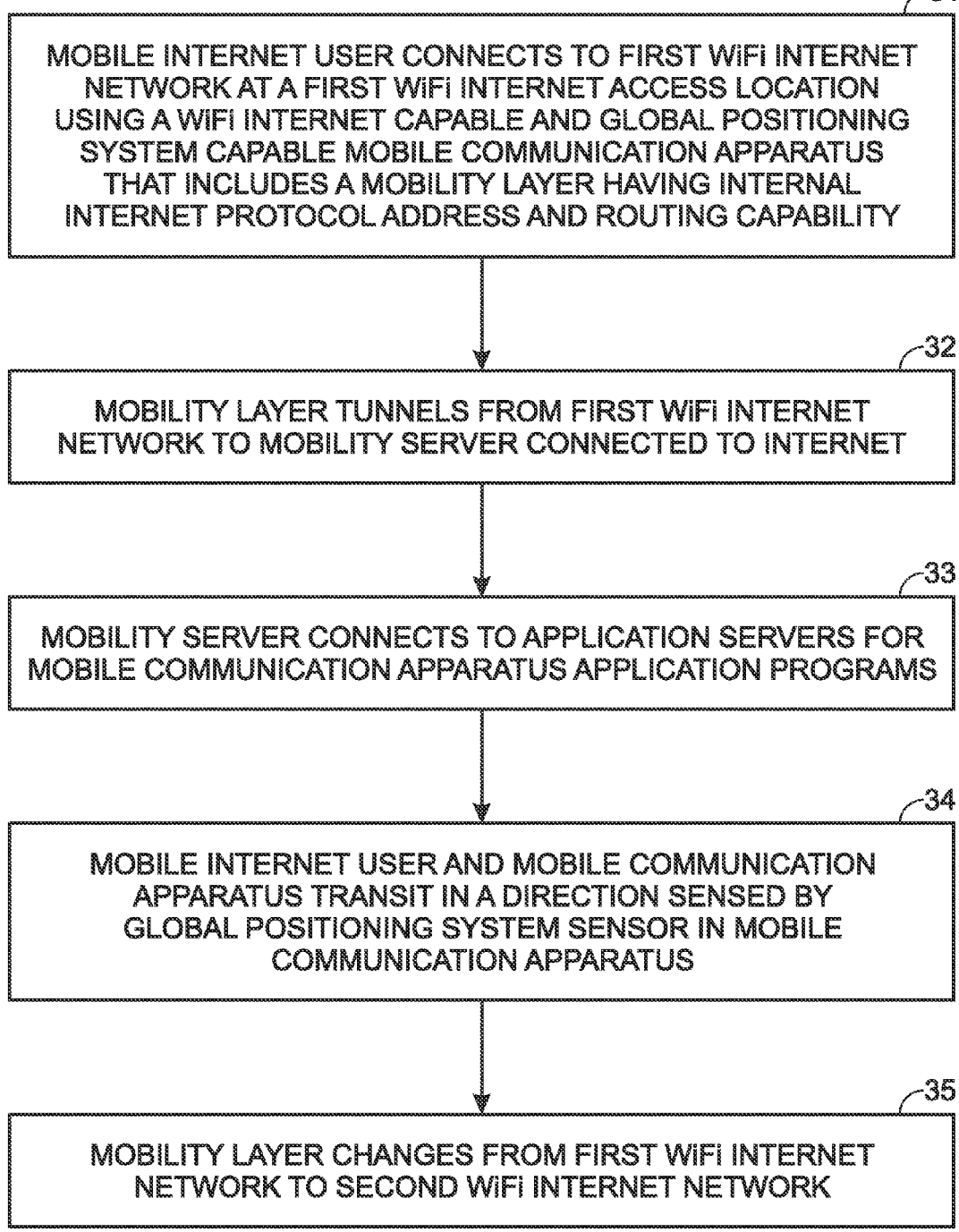

APPARATUS, METHOD AND PROGRAM PRODUCT FOR SEAMLESS WIFI NETWORK TRANSITIONS

BACKGROUND OF THE INVENTION

1. Field of the Invention

Embodiments relate generally to WiFi networks. More particularly, embodiments relate to connectivity to WiFi networks.

2. Description of the Related Art

With the advent of Internet access mobile communications technology, so also has evolved the presence of WiFi Internet access locations (i.e., hotspots) where an Internet access mobile communications technology user may gain access to an Internet connection and Internet content. Such WiFi Internet access locations may comprise locations including but not limited to commercial services locations (i.e., restaurants, hotels and other retail sales establishments), public services locations (i.e., airports, other transportation terminals, libraries and government offices) and private locations (i.e., residences).

While ready mobile access to Internet service and Internet content is desirable within the context of the information technology art, ready mobile access to Internet service and Internet content is nonetheless not entirely without problems within the information technology art. In that regard, ready and continuous mobile access to Internet service and Internet content for an Internet access mobile communications technology user may be problematic within the context of continuous connectivity, since commonly an Internet access mobile communications technology user must independently connect to separate WiFi Internet service providers to secure an Internet connection and Internet content at individual WiFi Internet access locations.

Thus, desirable are apparatus, methods and program products that provide for continuity within the context of mobile connectivity to a plurality of WiFi Internet access locations.

SUMMARY

Embodiments include an apparatus, a method and a program product for seamless and sequential connection of a mobile network user (i.e., typically mobile Internet user) to a plurality of WiFi networks at a plurality of WiFi network access locations. The embodiments also include a method for seamless and sequential connection of a mobile network user to a WiFi network and a cellular network. The apparatus, the methods and the program product in accordance with the embodiments include a mobility layer within a wireless network capable and global positioning system capable mobile communication apparatus that includes an internal network protocol address and a routing capability. The mobility layer connects via tunneling with a mobility server that is incorporated into a network infrastructure. In turn, the mobility server secondarily connects with application servers for application programs used on the mobile communications apparatus.

In particular, the non-limiting embodiments provide a mobile Internet user with an ability to transition from a first WiFi Internet network at a first WiFi Internet access location to a second WiFi Internet network at a second WiFi Internet access location different than the first WiFi Internet access location without mobile Internet user initiated activities directed towards disrupting any WiFi Internet connections at the first WiFi Internet access location or the second WiFi Internet access location. In further particularity in accordance with the embodiments, a mobile Internet user may retain an open Internet service connection or Internet content connection even in a geographic location that includes no available WiFi Internet service coverage.

While the non-limiting embodiments are directed primarily towards WiFi Internet access, alternative embodiments may be directed towards: (1) WiFi access to networks other than the Internet; or alternatively to (2) WiFi access (i.e., Internet or not) in conjunction with access to additional networks. Such other additional networks may include, but are not necessarily limited to, intranet networks which are suitable for WiFi access, as well as cellular communication networks and Bluetooth networks.

A particular apparatus in accordance with the embodiments includes a wireless network capable and global positioning system capable mobile communication apparatus comprising a mobility layer comprising an internal network address and a routing capability.

A particular method in accordance with the embodiments includes providing a communications system comprising: (1) a wireless network capable and global positioning system capable mobile communication apparatus connected to a network at a first WiFi network access location and including a mobility layer having an internal network protocol address and a routing capability; and (2) a mobility server tunneled to the mobility layer at the first WiFi network access location, the mobility layer programmed to tunnel to the mobility server at a geographically defined second WiFi network access location predicated upon a global positioning system determined position of the mobile communication apparatus. This particular method also includes transiting the mobile communication apparatus to the second WiFi network access location while the mobility layer simultaneously tunnels to the mobility server at the second WiFi network access location.

Another particular method in accordance with the embodiments includes providing a wireless network capable and global positioning system capable mobile communication apparatus including a mobility layer having an internal network protocol address and a routing capability. The wireless network capable and global positioning system capable mobile communication apparatus is capable of connecting to a WiFi network and a cellular network. This particular method also includes sequentially connecting the mobile communications apparatus to one of the WiFi network and the cellular network, and then the other of the WiFi network and the cellular network, predicated upon a global positioning system determined position of the mobile communication apparatus.

A particular computer program product in accordance with the embodiments includes a tangible medium encoded with computer readable instructions to connect within a communication system comprising: (1) a wireless network capable and global positioning system capable mobile communication apparatus connected to a network at a first WiFi network access location and including a mobility layer having an internal network protocol address and a routing capability; and (2) a mobility server connected to the network and tunneled to the mobility layer at the first WiFi network access location, the mobile communication apparatus to the network at a second WiFi network access location separate from the first WiFi network access location via tunneling from the mobility layer to the mobility server.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein:

FIG. 3 shows a plurality of process steps directed towards sequential mobile Internet user WiFi Internet access connectivity in accordance with the embodiments.

DETAILED DESCRIPTION OF THE EMBODIMENTS

Embodiments include an apparatus, a method and a program product that provide for sequentially and seamlessly connecting a mobile communications apparatus used by a mobile Internet user to a plurality of WiFi Internet networks at a series of WiFi Internet access locations (i.e., hotspots). The apparatus, the method and the program product in accordance with the embodiments realize the foregoing results in-part by including a mobility layer within the mobile communications apparatus. Within the embodiments, the mobile communication apparatus also includes a wireless network capability, a global positioning system capability, an internal Internet protocol address and a routing capability. The mobility layer within the mobile communication apparatus is used in conjunction with a mobility server that is incorporated into the Internet communication network infrastructure.

In accordance with further description below, the mobility layer includes particular features that allow for a seamless transition from a first WiFi Internet network to a second WiFi Internet network absent need on the part of a mobile Internet user to manually disconnect from the first WiFi Internet network at the first WiFi Internet access location and reconnect to the second WiFi Internet network at the second WiFi Internet access location.

Figure 1A:
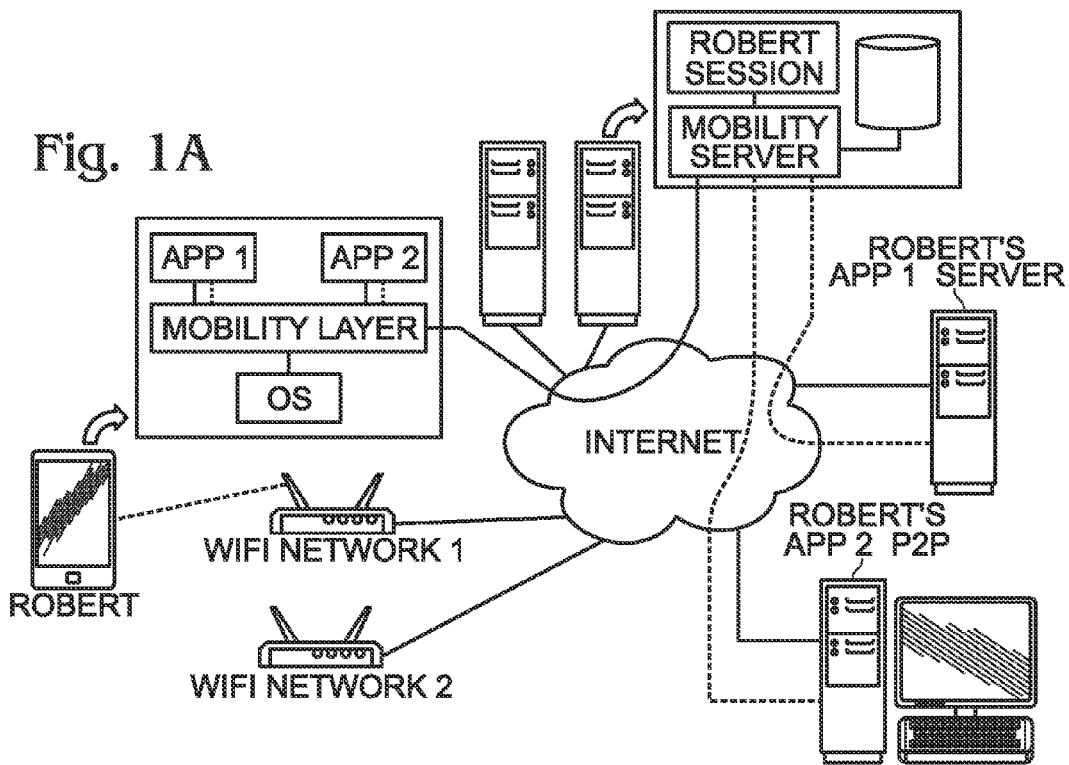
FIG. 1(a) and FIG. 1(b) show a plurality of schematic diagrams of an Internet communication network in accordance with the embodiments including a mobile Internet user connected to a particular first WiFi Internet network at a first WiFi Internet access location (FIG. 1(a)) and to a particular second WiFi Internet network at a particular second WiFi Internet access location (FIG. 1(b)).
Figure 1B:
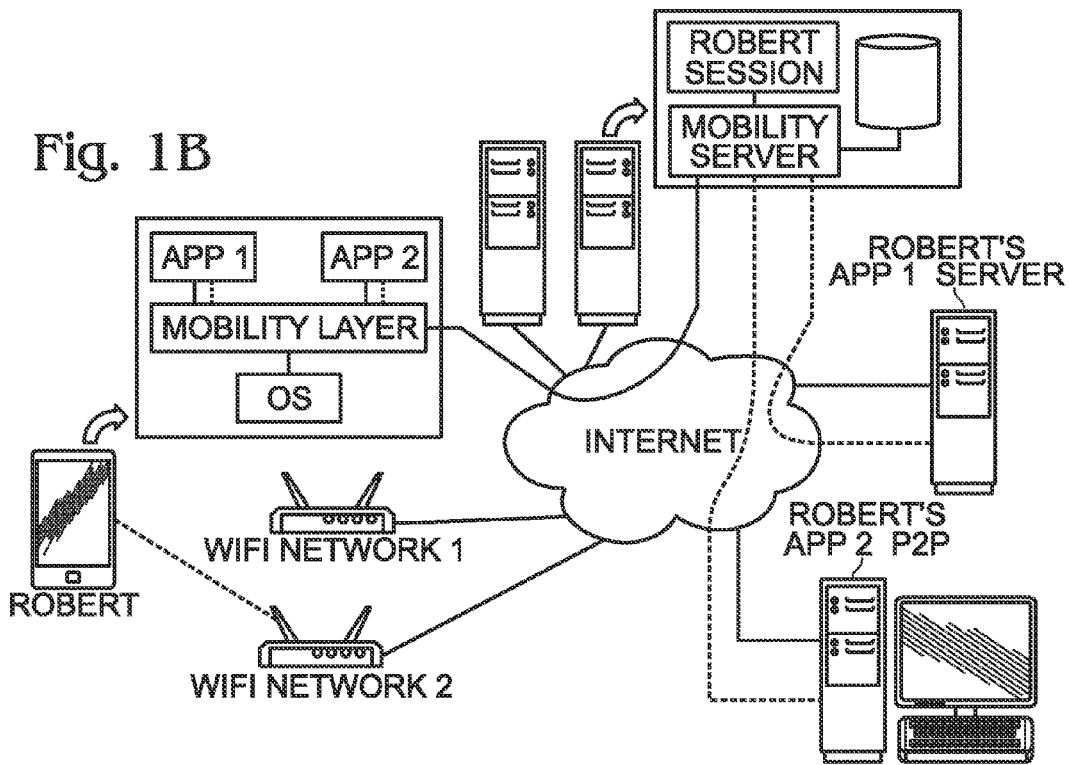
Figure 2A:
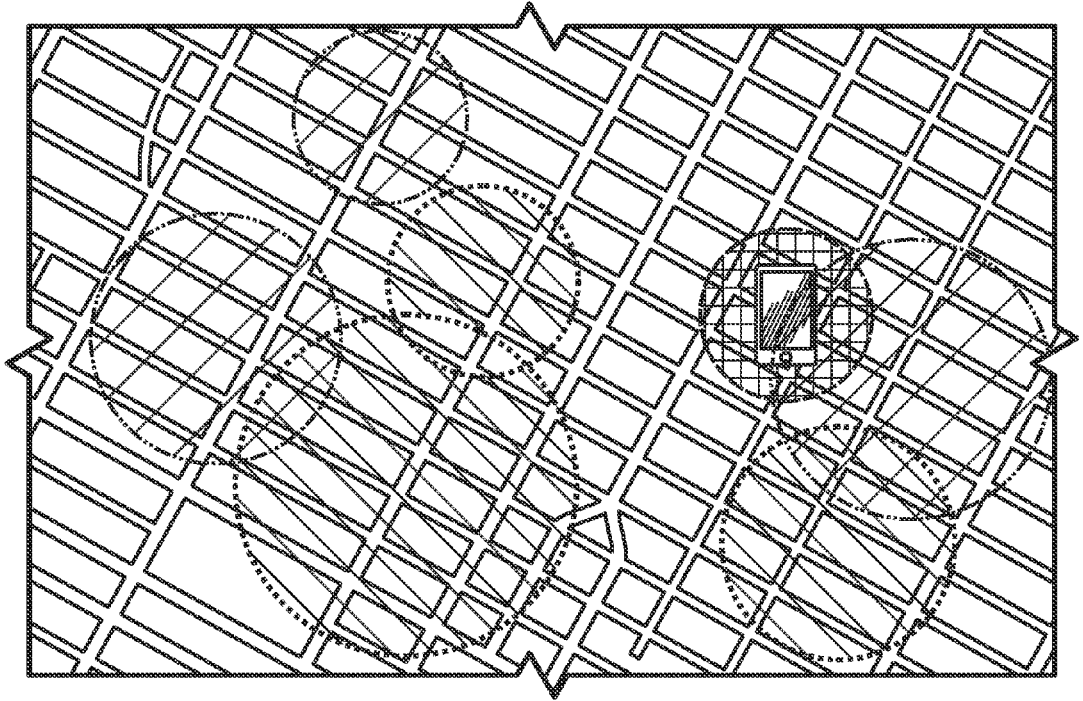
FIG. 2(a), FIG. 2(b), FIG. 2(c) and FIG. 2(d) show a series of geographically mapped WiFi Internet access locations (or alternative network access locations) in conjunction with a mobile Internet user transiting interposed between the series of geographically mapped WiFi Internet access locations.
Figure 2B:
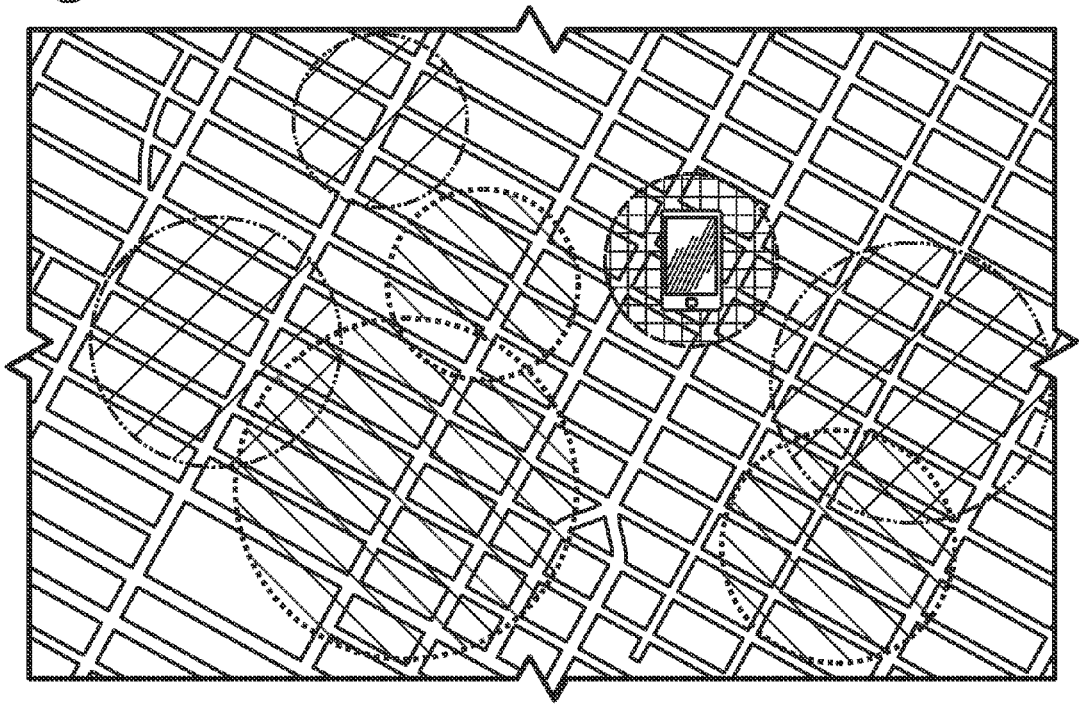
Figure 2C:
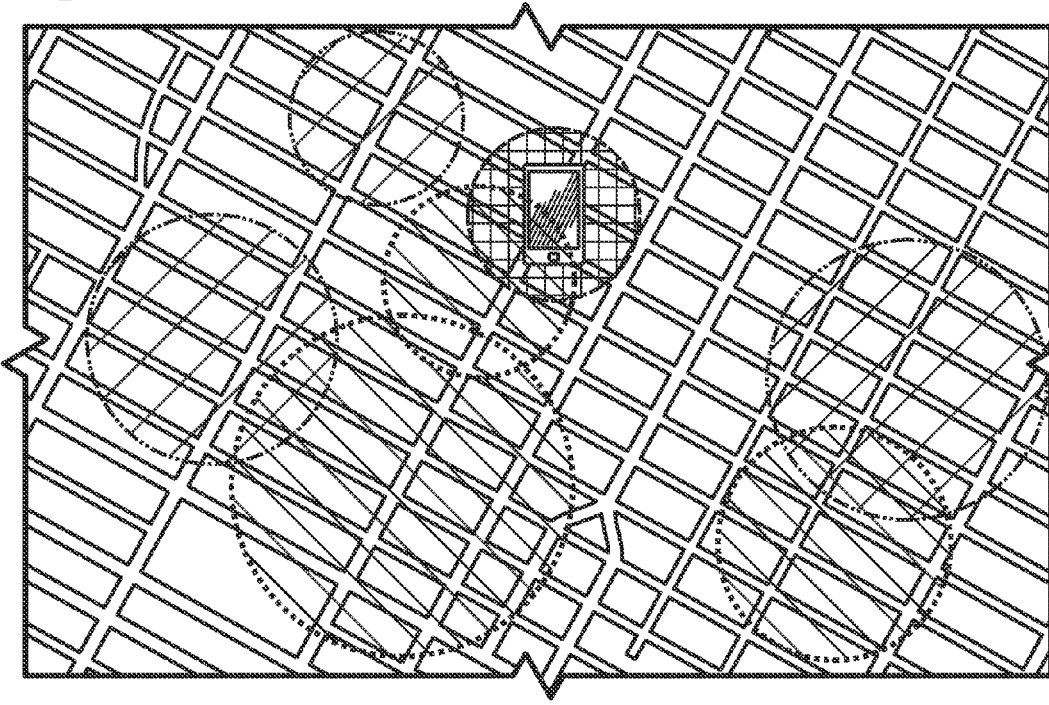
Figure 2D:
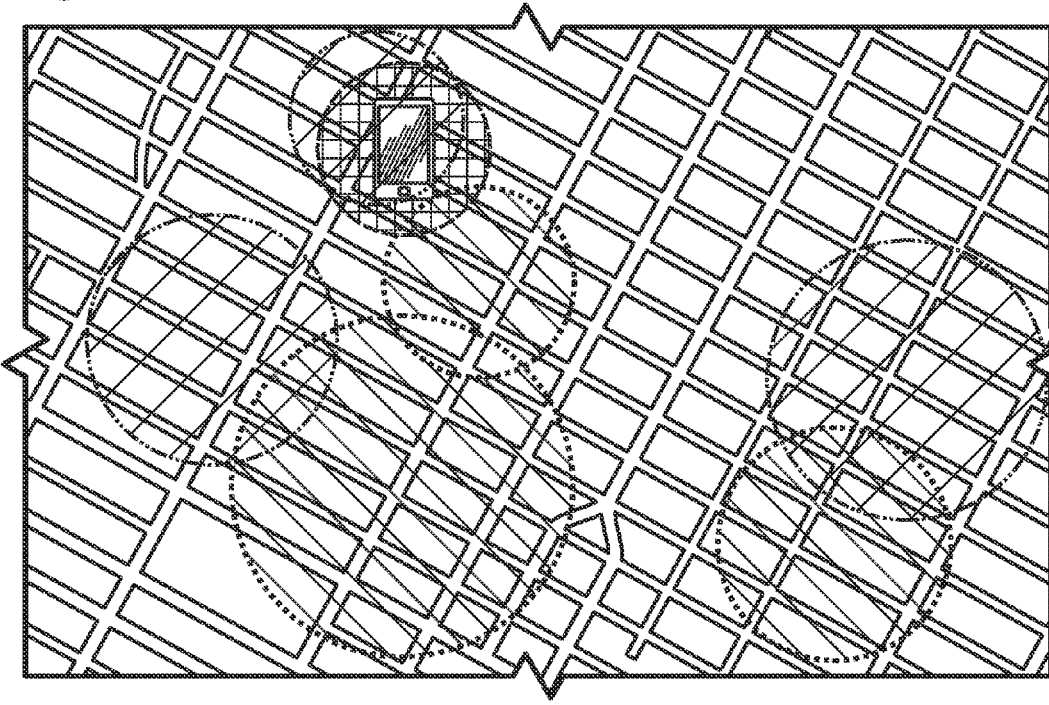

FIG. 1(a) and FIG. 1(b) show a plurality of schematic diagrams illustrating an Internet communications system in accordance with the embodiments at progressive stages in access to the Internet communications system in accordance with a method in accordance with the embodiments.

FIG. 1(a) shows as a central component an Internet (i.e., the Internet), which is intended to include operational infrastructure components of the Internet, as those operational infrastructure components are conventionally assembled and connected. Also illustrated within FIG. 1(a) as connected in a clock-wise direction starting at about a 9 o'clock position to the Internet are: (1) a second WiFi Internet network (WiFi Network 2); (2) a first WiFi Internet network (WiFi Network 1); (3) an undesignated server (at a top central location); (4) a particular server designated as a mobility server; (5) a particular server designated as Robert's App 1 server; and (6) a particular component (i.e., generally a server) designated as Robert's App 2 P2P (peer-to-peer) component.

With the exception of the mobility server, each of the foregoing remaining components that comprise and are appended to the Internet communication network that is illustrated in FIG. 1(a) may comprise components that are otherwise generally conventional in the Internet communications network infrastructure design and assembly art. For example, each of: (1) the undesignated server; (2) Robert's App 1 server; and (3) Robert's App 2 P2P component may comprise server hardware that is otherwise generally conventional in the Internet communications network infrastructure design and assembly art. Such server hardware may include, but is not necessarily limited to desktop server hardware, midrange server hardware and mainframe server hardware.

Similarly, the first WiFi Internet network (WiFi Network 1) and the second WiFi Internet network (WiFi Network 2) may comprise WiFi Internet network components that are otherwise also generally conventional in the Internet communications network infrastructure design and assembly art. Thus, the first WiFi Internet network (WiFi Network 1) and the second WiFi Internet network (WiFi Network 2) may include router components and antenna components as are otherwise generally conventional in the Internet communications network infrastructure design and fabrication art.

Finally, FIG. 1(a) at the left hand side shows a mobile communications apparatus (i.e., a cell phone apparatus designated Robert) connected to the first WiFi Internet network (WiFi Network 1). FIG. 1(a) at the left hand side also illustrates in general the various components that are included within a mobile communications apparatus in accordance with the embodiments. As is illustrated within the schematic diagram of FIG. 1(a) the mobile communication apparatus includes a mobility layer interposed between an operating system layer OS and application program layer App1/App2. As is illustrated within the schematic diagram of FIG. 1(a), the mobility layer connects through the first WiFi Internet network (WiFi Network 1) to the mobility server that is also attached to the Internet. In turn, the mobility server, which is connected to the Internet along with the three other non-WiFi components that are illustrated in FIG. 1(a) provides the secondary connections to two of those other three non-WiFi components. Particular secondary connections are shown between the mobility server and Robert's App 1 Server, as well as Robert's App 2 P2P.

FIG. 1(b) shows a schematic diagram illustrating the Internet communications network of FIG. 1(a), but wherein the mobile communication apparatus designated as Robert is now connected to the second WiFi Internet network (WiFi Network 2) rather than the first WiFi Internet network (WiFi Network 1). Further details regarding this transition of the mobile communication apparatus designated Robert from the first WiFi internet network to the second WiFi Internet network are described below.

A core consideration of the embodiments is that a mobile communications apparatus (i.e., such as but not limited to a cell phone or a laptop computer) comprises the mobility layer component that will typically but not necessarily comprise a software component (i.e., firmware and hardware components are also not precluded for the mobility layer component), interposed between an operating system network services layer and an application program layer that operates beneath the operating system network services layer. As is illustrated within FIG. 1(a), the mobility layer component in accordance with the embodiments creates a tunnel (i.e., the direct connection as illustrated in FIG. 1(a) and FIG. 1(b))

with the additional Internet infrastructure component that is designated as the mobility server (where the mobility server is intended to be deployed in a cloud over the Internet). The mobile communications apparatus mobility layer includes an internal Internet protocol address, which the application programs within the application program layer on the mobile communication apparatus will use to connect to the Internet. As well, the mobile communications apparatus (or the mobility layer within the mobile communication apparatus) includes a routing capability.

Connected to the other end of the tunnel that starts at the mobility layer, the mobility server is intended to create secondary connections to each of Robert's App 1 Server and Robert's App 2 P2P component that the mobile communications apparatus intends to access for operative application programs. Thus, from a mobile communications apparatus viewpoint, the Internet communication system in accordance with FIG. 1(a) will always provides an active connection with respect to the mobility layer within the mobile communication apparatus, insofar as a socket is opened in the mobility layer to tunnel to the mobility server). Similarly, from a general application server viewpoint, the mobile communication apparatus application programs are always connected insofar as the application servers are connected to the mobility server.

Within the context of circumstances where a mobile Internet user transitions from a particular first WiFi Internet network at a first WiFi Internet access location having a particular first external Internet protocol address to a particular second WiFi Internet network at a particular second WiFi Internet access location having a particular second external Internet protocol address, and thus an external Internet protocol address changes, the mobility layer will reestablish the tunnel with the mobility server by adjusting the routing tables within the mobile communications apparatus with respect to the new (i.e., second) external Internet protocol address. In addition, the mobility layer will reauthenticate the mobile communication apparatus with the mobility server. In turn, the mobility server is also intended to retain session information from the previous connection for the mobile communication apparatus and the mobile internet user, and all application servers connected to the mobility server, and reassociate that information with the mobile communication apparatus when the mobile Internet user transitions to the new (i.e., second) WiFi Internet network at the new (i.e., second) WiFi Internet access location.

Within the context of the embodiments, instead of using an external Internet protocol address of a WiFi Internet network at a WiFi Internet access location as a unique identifier, a particular mobile communication apparatus is intended to be uniquely identified within the context of an internal Internet protocol address that is contained within the mobility layer of a mobile communications apparatus. Alternatively, many different pieces or combinations of information could plausibly be used to provide the unique identifier within the context of the internal Internet protocol address. Specific examples may include, but are not necessarily limited to a particular user's phone number and/or email address. Alternatively, a combination of an internal IP address and an external IP address may under certain circumstances may also be contemplated. To be considered within these alternative combinations are methods of implementation, including aspects of translation of combined information into particular routing layers.

As an additional core feature or consideration of the embodiments, the mobility layer is also anticipated to scan, map and store information of all open and closed WiFi Internet networks to which a mobile communication apparatus can connect (i.e., a library or catalogue of WiFi Internet networks). The mobility layer will also associate this information with geographical data based on the global positioning system input from a global positioning system component associated with the mobile communications apparatus. As a mobile Internet user transits a mobile communications apparatus in any direction, the mobility layer within the mobile communication apparatus is intended to automatically determine when to transition from a particular WiFi Internet network to a different particular WiFi Internet network. Such a determination may be made using a particular WiFi Internet network power at a particular global positioning system determined position.

The foregoing mapping of WiFi Internet networks within the context of global positioning system positions in accordance with the embodiments enables another core aspect of the embodiments, which includes an ability to keep a particular WiFi Internet network connection open even in a location where there is no WiFi Internet network coverage. Such WiFi Internet network coverage may be unavailable for reasons including but not limited to: (1) a WiFi Internet network operational unavailability; or alternatively (2) a mobile Internet user may be currently out of the reach of any otherwise operative WiFi Internet network. Under circumstances where a mobile Internet user is mobile, and plausibly may reach a WiFi Internet access location within a predetermined timescale, a mobility layer in accordance with the embodiments may keep all connections opened for a specified period of time, allowing the mobile Internet user to continue to use the Internet service to which the mobile Internet user was previously connected. Moreover, the mobility layer may also suggest to a mobile Internet user a particular direction to travel to recover WiFi Internet network coverage.

In accordance with the embodiments, and in general, a mobile communications apparatus will only be connected to the mobility server, and the connection between the mobile communication apparatus and the mobility server may under certain circumstances be unstable since a mobile Internet user will presumably intentionally be changing WiFi Internet networks regularly as the mobile Internet user transits to available WiFi Internet networks.

Conventionally, when a mobile internet user transitions from a first WiFi Internet network to a second WiFi Internet network, the mobile Internet user will of necessity also change an external Internet protocol address associated with the first WiFi Internet network to an external Internet protocol address associated with the second WiFi Internet network. As noted above, and within the context of the embodiments, a login to the mobility server will not use a conventional external Internet protocol address, but rather an internal Internet protocol address associated with the mobility layer of the mobile communication apparatus (and thus inferentially with the mobile communication apparatus). Moreover, when a mobile Internet user connects to a WiFi Internet network at a WiFi Internet access location, an existing set of connections of the mobility server with various application program servers that has been retained is reestablished allowing continuing operation of those application program servers.

In order to realize the foregoing operation of the mobility server, the mobility layer within the mobile communication apparatus is intended to be part of the mobile communication apparatus. Thus, the mobility layer undertakes activities including but not limited to: (1) making routing decisions; (2) tunneling all the data packets to the mobility server; (3) securing with the mobility server a hand-over; and (4) undertaking a login again with a new WiFi Internet network that has a new Internet protocol address.

Within the context of the embodiments, it is noted that insofar as the connections between the mobility server and the application servers are never disrupted the application servers may remain operative even under circumstances where a mobile Internet user transits from a first WiFi Internet network to a second WiFi Internet network. Moreover, insofar as the application servers are thus continuously connected to the mobility server, when a user disconnects from a first WiFi Internet network and connects to a second WiFi Internet network the application servers will also be unaware of such a disconnection and reconnection. Finally, although the mobility server may thus determine any amount of time to keep open a connection with an application server absent connection with a mobility layer, the mobility server may for example and without limitation determine that if a mobile Internet user does not locate and connect to an available WiFi Internet network within set period of time, such as but not limited to five minutes, all connections between the mobility server and any application servers would be closed.

An implementation of a mobility server in accordance with the embodiments is intended to be dependent upon any of several types of software that the mobility server may support. In addition, desirable for a tunneling connection between a mobility layer and a mobility server is some type of cryptographic software. Moreover, within the context of encrypted connection, also to be considered may be one cryptographic key for a mobility layer to mobility server connection and a different cryptographic key for a mobility server to application server connection.

Thus, embodiments as described above contemplate the possibility that in order to expand WiFi Internet coverage globally, residential owners and businesses that have closed (i.e., restricted) WiFi Internet networks may potentially be invited to become part of a grid of WiFi Internet networks and access locations, where registered mobile Internet users may secure access to use the grid of WiFi Internet networks. The residential owners and businesses may plausibly benefit (i.e., receive a benefit or incentive) from this WiFi Internet network grid service by receiving monetary incentives from advertisers that may use this WiFi Internet network infrastructure to send small ads to mobile Internet users, for instance sending an ad to a mobile Internet user that includes a short message. Mobile Internet users disinclined to receiving ads (i.e., sustaining a detriment) may potentially subscribe to a service and pay a periodic fee (i.e., a detriment), where the wireless Internet network owners may receive a percentage of that fee based on the number of mobile Internet users that accessed their WiFi Internet networks. The foregoing WiFi Internet restricted access services scenario also contemplates a broker entity (which may receive a commission) interposed between the WiFi Internet user that sustains the detriment to access the closed (i.e., restricted) WiFi Internet networks and the individual WiFi Internet network owners that receive the benefit or incentive.

While FIG. 1(a) and FIG. 1(b) illustrate an embodiment that is directed towards WiFi Internet access incident to transit of a mobile communication apparatus from a first WiFi Internet access location (i.e., WiFi Network 1) to a second WiFi Internet access location (i.e., WiFi Network 2), where both the first WiFi Internet access location and the second WiFi Internet access location are in turn connected to the same Internet as a core network component, the embodiments are not intended to be so limited. Rather the embodiments are also intended to include, but are not necessarily limited to, circumstances where a mobile communication apparatus is initially connected to a first communication network that is nominally separate from a second communication network to which the mobile communication apparatus is next connected.

For example, a mobile communication apparatus may first be connected with a cellular communication network such as but not limited to a 3G or 4G cellular communication network. Thus, under circumstance where, for example, coverage of a cellular communication network becomes inadequate or cellular communication network traffic within the cellular communication network becomes excessive, a mobile communication apparatus in accordance with the embodiments may switch from the cellular communication network to a different communication network, such as but not limited to a WiFi intranet communication network or a WiFi Internet communication network, predicated upon local availability, and in accordance with the above outlined methodology. Moreover, the embodiments also contemplate seamless transitions from such other communication networks to cellular communication networks. However, it is noted that connection of a mobile communication apparatus in accordance with the embodiments to a cellular communication network utilizes a separate cellular phone number rather than an internal network address.

FIG. 2(a) to FIG. 2(d) show a series of graphs illustrating in general transit of a mobile Internet user (i.e., the darker circle including the cell phone icon) through a mapped region that includes a plurality of WiFi Internet networks (of which there are six). At FIG. 2(a) the mobile Internet user is connected to the most right located WiFi Internet network. At FIG. 2(b) the mobile Internet user has traveled due northwest and is not connected to any WiFi Internet network. At FIG. 2(c) and FIG. 2(d) the mobile Internet user continues to travel due northwest and sequentially connect to the two uppermost lying WiFi Internet networks.

In accordance with discussion above, in the alternative of six WiFi Internet networks within the mapped region of FIG. 2(a) to FIG. 2(d), at least one of the WiFi Internet networks may alternatively comprise an intranet communication network or further more particularly alternatively comprise a cellular communication network, so that the embodiments may alternatively in particular consider seamless and sequential connection between networks that include both WiFi networks and cellular networks.

FIG. 3 shows a diagram illustrating a series of sequential process steps for mobile Internet user Internet access in accordance with the embodiments. Starting with reference numeral 31, a mobile Internet user connects to a first WiFi Internet network at a first WiFi Internet access location using a WiFi Internet capable and global positioning system capable mobile communication apparatus that includes a mobility layer having an internal Internet protocol address and a routing capability.

The foregoing activities that are associated with reference numeral 31 are representative of the activities that lead to the Internet communication system illustrated in FIG. 1(a).

In accordance with reference numeral 32, the mobility layer tunnels from the first WiFi Internet network to a mobility server connected to the Internet.

The foregoing activities that are associated with reference numeral 32 are also representative of the activities that lead to the Internet communication system illustrated in FIG. 1(a).

In accordance with reference numeral 33, the mobility server connects to application servers for the mobile communication apparatus applications.

The foregoing activities that are associated with reference numeral 33 are also representative of the activities that lead to the Internet communication system illustrated in FIG. 1(a).

In accordance with reference numeral 34, the mobile Internet user and the mobile communication apparatus transit in a direction sensed by a global positioning system sensor in the mobile communication apparatus.

The foregoing activities that are associated with reference numeral 34 are representative of activities that lead to the Internet communication system illustrated in FIG. 1(b).

Finally, in accordance with reference numeral 35, the mobility layer changes from the first WiFi Internet network to a second WiFi Internet network.

The foregoing activities that are associated with reference numeral 35 are also representative of the activities that lead to the Internet communication system illustrated in FIG. 1(b).

Thus, in accordance with the embodiments, and in particular as illustrated in FIG. 1(a) and FIG. 1(b), as well as within FIG. 3, the embodiments provide an apparatus and a method for seamless mobile Internet access to a plurality of WiFi Internet networks at a plurality of WiFi Internet access locations.

Figure 4:
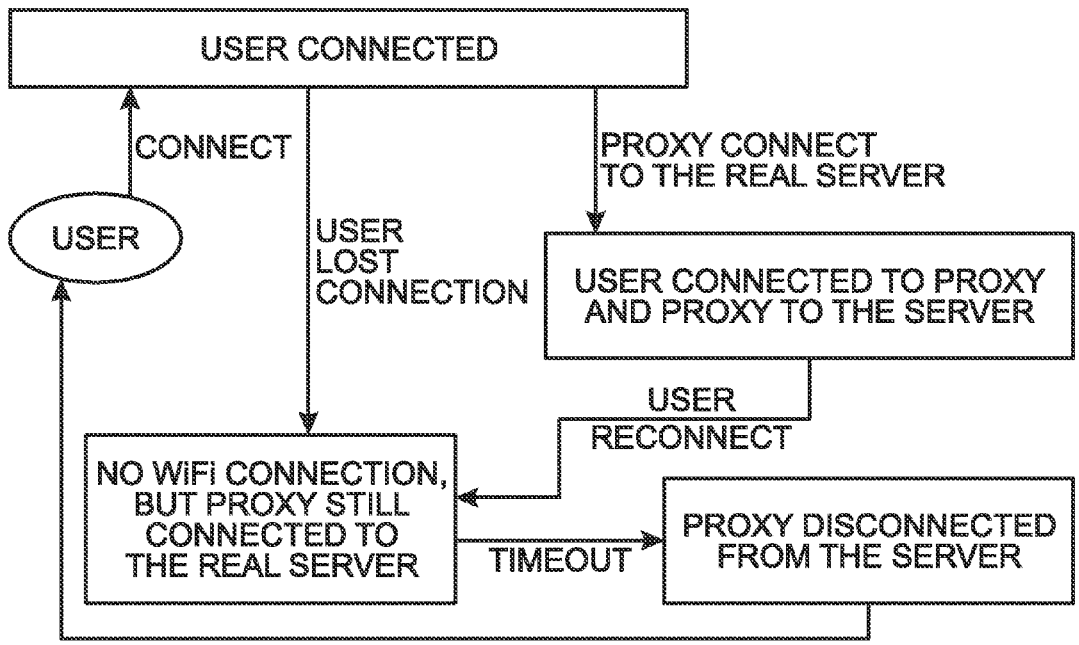
FIG. 4 shows a graphical representation of a mobile WiFi Internet communications scheme in accordance with the embodiments.

FIG. 4 shows a diagram illustrating a general sequence of connection options for a mobile Internet user with respect to a WiFi Internet network in accordance with the embodiments.

Starting with a mobile Internet user (i.e., a User) at the left hand side of FIG. 4, the mobile Internet user connects to a WiFi Internet network at a WiFi Internet access location (i.e., user connected). Such a connection may correspond with establishing the mobile communication apparatus connection to the first WiFi Internet network as is illustrated in FIG. 1(a). Incident to this connection, and as is also illustrated in FIG. 1(a), a mobility layer within the mobile communication apparatus tunnels to a mobility server that is attached to the Internet. Within FIG. 4, such a mobility server is designated as a proxy server, and as is further illustrated in FIG. 4 at the right hand side, the proxy server connects to application program servers. FIG. 4 at bottom provides that a situation may exist where a mobile communication apparatus may lose a tunneling connection between a mobile communication apparatus and the mobility server. Under such circumstances, and with an appropriate timeout, the mobility server proxy server is disconnected from the application program servers and the user connect cycle may start again from the beginning.

Figure 5:
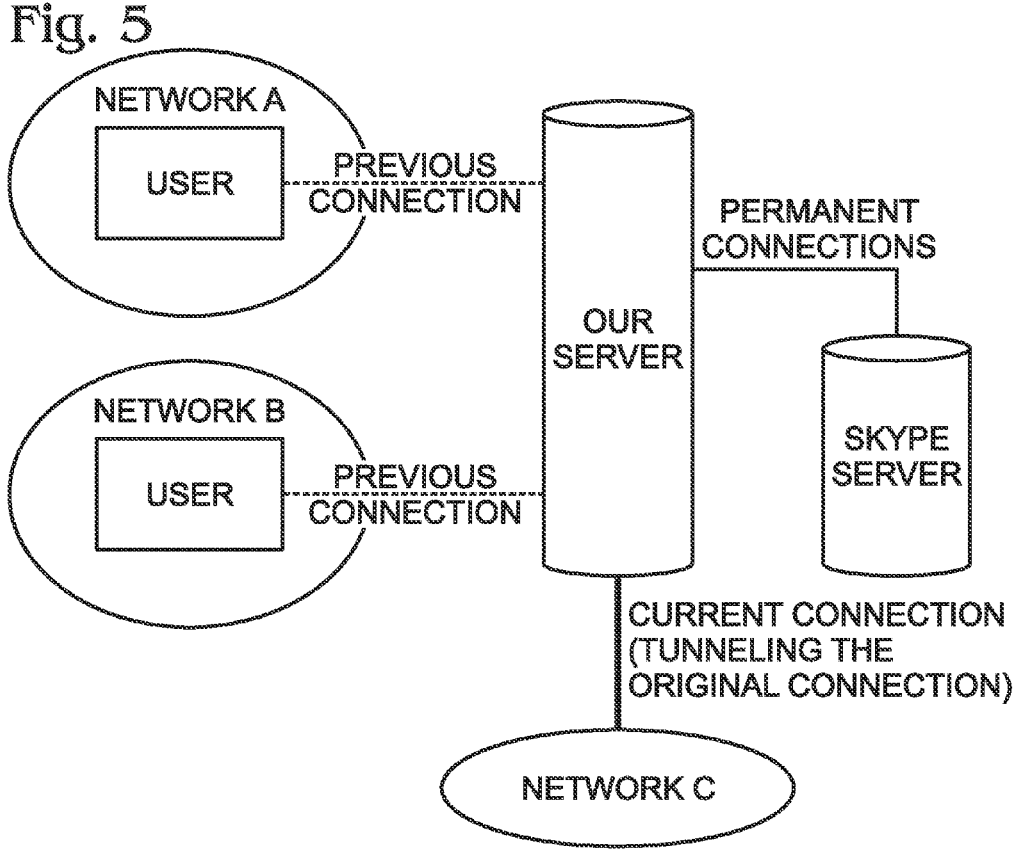
FIG. 5 shows a schematic diagram of a WiFi Internet network that relates to the WiFi Internet network of FIG. 1(a) and FIG. 1(b).

FIG. 5 briefly illustrates a feature of the embodiments. FIG. 5 shows the pathway of a user (i.e., a mobile Internet user) at network A (i.e., WiFi Internet network A) and network B (i.e., WiFi Internet network B) as previous connections. The user is presently connected at network C (i.e., WiFi Internet network C) via a tunneling connection between a mobility layer within a mobile communication apparatus and a mobility server (i.e., that is illustrated as Our Server). From the mobility server there exist permanent connections (i.e., subject to time out) to application program servers which may include, but are not necessarily limited to, a Skype™ server.

In order to facilitate operation of a network communications system in accordance with the embodiments, the embodiments also contemplate that a computer program product (i.e., that may, but not necessarily, be included within the mobility layer) is also within the context of the embodiments. Such a computer program product comprises a tangible medium that provides instructions encoded therein for connecting within a communication system comprising: (1) a wireless network capable and global positioning system capable mobile communication apparatus connected to a network at a first WiFi network access location and including a mobility layer having an internal network address and routing capabilities; and (2) a mobility server connected to the network and tunneled to the mobility layer at the first WiFi network access location, the mobile communication apparatus to the network at a second WiFi network access location separate from the first WiFi network access location via tunneling from the mobility layer to the mobility server.

Accordingly, within the context of the above, computer program product aspects of the embodiments may take the form of a computer program product embodied in one or more computer readable media having computer readable program code embodied thereon.

Any combination of one or more computer readable media may be utilized. The computer readable media may be a computer readable signal media or a computer readable storage media. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage media would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store, a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function or functions. It should also be noted that in some alternative implementations the functions noted in the block may occur out of the order noted in the figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instruction.

Accordingly, the embodiments of the invention are illustrative of the invention rather than limiting of the invention. Revisions and modifications may be made to components, connections and computer system architecture in accordance with the embodiments while still providing an apparatus, a method and a computer program product in accordance with the embodiments, further in accordance with the accompanying claims

What is claimed is:

1. A communications method comprising:
  providing a communications system comprising:
    a wireless network capable and global positioning system capable mobile communication apparatus connected to a network at a first WiFi network access location and including a mobility layer having an internal network protocol address and a routing capability; and
    a mobility server connected to the network and tunneled to the mobility layer at the first WiFi network access location, the mobility layer programmed to tunnel to the mobility server at an available geographically defined second WiFi network access location predicated upon a global positioning system determined position of the mobile communication apparatus;
  transiting the mobile communication apparatus to the second WiFi network access location while the mobility layer simultaneously tunnels to the mobility server at the second WiFi network access location.

2. The method of claim 1 wherein the network comprises the Internet.

3. The method of claim 1 wherein the communication system further comprises a catalogue of geographically defined WiFi network access locations available to the mobile communication apparatus.

4. The method of claim 1 wherein the mobile communications apparatus is selected from the group consisting of a smart phone and a laptop computer.

5. The method of claim 1 wherein:
  each of the first WiFi network access location and the second WiFi network access location comprises a restricted WiFi network access location, where a first WiFi network access location owner and a second WiFi network access location owner receives a benefit;
  the transiting of the mobile communication apparatus between the first WiFi network access location and the second WiFi network access location is undertaken by a user that sustains a detriment; and
  a transaction between the user and the first WiFi network access location owner and the second WiFi network access location owner is mediated by a broker.

6. The method of claim 1 wherein the mobility layer is located interposed between an operating system layer within the mobile communications apparatus and an application program layer within the mobile communication apparatus.

7. The method of claim 1 wherein mobility layer is also programmed to retain an open Internet connection even when the mobile communication apparatus is located interposed between available defined WiFi network access locations.

8. A communications method comprising:
  providing a wireless network capable and global positioning system capable mobile communication apparatus including a mobility layer having an internal network protocol address and a routing capability, the wireless network capable and global positioning system capable mobile communication apparatus being capable of connecting to a WiFi network and a cellular network;
  sequentially connecting the mobile communications apparatus to one of the WiFi network and the cellular network, and then the other of the WiFi network and the cellular network, predicated upon a global positioning system determined position of the mobile communication apparatus.

9. A computer program product comprising a non-transitory storage medium encoded with computer readable instructions to connect within a communication system comprising:
  a wireless network capable and global positioning system capable mobile communication apparatus connected to a network at a first WiFi network access location and including a mobility layer having an internal network address and a routing capability; and
  a mobility server connected to the network and tunneled to the mobility layer at the first WiFi network access location, the mobile communication apparatus to the network at a second WiFi network access location separate from the first WiFi network access location via tunneling from the mobility layer to the mobility server.

10. The computer program product of claim 9 wherein the non-transitory storage medium is further encoded with computer readable instructions to sequentially connect the mobile communications apparatus to one of a WiFi network and a cellular network and then the other of the WiFi network and the cellular network.

11. The computer program product of claim 9 wherein communication system further comprises a catalogue of geographically defined WiFi network access locations available to the mobile communication apparatus.

12. The computer program product of claim 9 wherein the mobile communication apparatus is selected from the group consisting of a smart phone and a laptop computer.

13. The computer program product of claim 9 wherein the mobility layer is located interposed between an operating system layer within the mobile communications apparatus and an application program layer within the mobile communications apparatus.

14. The computer program product of claim 9 wherein mobility layer is also programmed to retain an open network connection even when the mobile communication apparatus is located interposed between available defined WiFi network access locations.

\* \* \* \* \*